United States Patent [19]

Thompson

[11] Patent Number: 4,888,947
[45] Date of Patent: Dec. 26, 1989

[54] SECONDARY OIL SYSTEM

[75] Inventor: Douglas K. Thompson, Speedway, Ind.

[73] Assignee: General Motors Corporation, Detroit, Mich.

[21] Appl. No.: 264,576

[22] Filed: Oct. 31, 1988

[51] Int. Cl.$^4$ .................................................. F02C 7/06
[52] U.S. Cl. ..................................... 60/39.08; 184/6.4; 184/6.11
[58] Field of Search ............... 60/39.08; 184/6.4, 6.11, 184/6.26

[56] References Cited

U.S. PATENT DOCUMENTS

| | | | |
|---|---|---|---|
| 3,779,345 | 12/1973 | Barnes et al. | 184/6.4 |
| 4,002,224 | 1/1977 | Easter | 60/39.08 |
| 4,153,141 | 5/1979 | Methlie | 184/6.4 |
| 4,284,174 | 8/1981 | Salvana et al. | 184/6.4 |
| 4,309,870 | 1/1982 | Guest et al. | 60/39.08 |
| 4,383,421 | 2/1983 | Camboulives et al. | 60/39.08 |
| 4,390,082 | 6/1983 | Swearingen | 60/39.08 |
| 4,433,539 | 2/1984 | Norris et al. | 184/6.11 |
| 4,569,196 | 2/1986 | Waddington et al. | 184/6.4 |
| 4,717,000 | 1/1988 | Waddington et al. | 184/61 |
| 4,741,155 | 5/1988 | McCarty | 69/39.02 |

FOREIGN PATENT DOCUMENTS 2130308 5/1984 United Kingdom ............... 60/39.08

Primary Examiner—Donald E. Stout
Attorney, Agent, or Firm—Saul Schwartz

[57] ABSTRACT

A secondary oil system for a flight propulsion gas turbine engine becomes operative only when engine fuel pressure is normal and engine primary oil pressure is abnormally low. The secondary oil system includes an air circuit having a mist circuit portion, a pilot operated air valve which normally blocks the air circuit, and a pilot valve responsive to fuel pressure and primary oil pressure to actuate the air valve. When the air circuit is unblocked, air flow in the mist circuit portion aspirates oil from a reservoir tank which oil is dispersed as a mist directed at a bearing in the sump.

4 Claims, 2 Drawing Sheets

SECONDARY OIL SYSTEM

This invention was made in the course of work under a contract or subcontract with the United States Department of Defense.

FIELD OF THE INVENTION

This invention relates to secondary oil systems for aircraft propulsion gas turbine engines.

BACKGROUND OF THE INVENTION

To the end of providing limited flight capability after loss of primary oil pressure in a flight propulsion gas turbine engine, secondary oil systems have been proposed which release reserve oil supplies in response to a loss or substantial reduction of primary oil pressure. Also, secondary oil systems have been proposed in which reserve oil is dispersed as a mist to maximize lubrication and cooling. A secondary oil system according to this invention lubricates with an air/oil mist, cools with compressed air, and incorporates a relatively simple arrangement for activating the secondary oil system.

SUMMARY OF THE INVENTION

This invention is a new and improved secondary oil system for a gas turbine engine of the type having a reservoir tank in a pressurized bearing sump. In the secondary oil system according to this invention, the reservoir tank is normally part of the primary oil system of the engine and holds a reserve oil supply for distribution outside the primary oil system when primary oil flow stops. The secondary oil system according to this invention includes an air circuit from the engine's compressor to the pressurized bearing sump, a mist nozzle in a mist circuit portion of the air circuit, an oil supply duct from the reservoir tank to the mist nozzle, a secondary oil system air valve which normally blocks the air circuit so that no oil is drawn through the supply duct to the mist nozzle, and a pilot valve for operating the air valve to a position opening the air circuit to initiate secondary lubrication. The pilot valve responds to engine fuel pressure and to oil pressure in the primary oil system and opens the secondary oil system air valve when fuel pressure is normal and oil pressure is abnormally low, a combination characteristic of in-flight stoppage of primary oil flow. When the secondary oil system air circuit is unblocked, compressed air is ducted to the bearing through a cooling circuit portion of the air circuit to cool the bearing. In addition, airflow in the mist circuit portion creates a low pressure zone at the tip of the mist nozzle whereby oil is aspirated from the reservoir tank and dispersed as a mist directed to the bearing for secondary lubrication.

DESCRIPTION OF A PREFERRED EMBODIMENT

Figure 1:
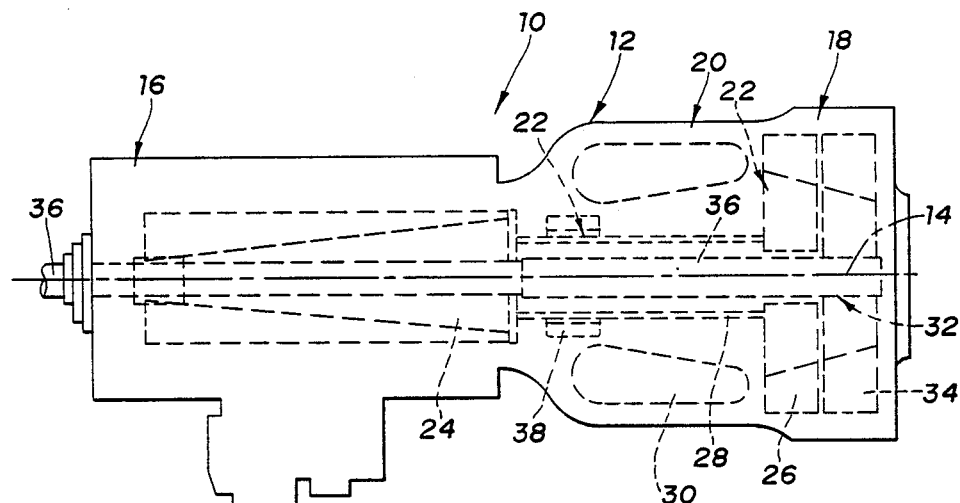
FIG. 1 is a schematic side view of a flight propulsion gas turbine engine having a secondary oil system according to this invention.

Referring to FIG. 1 of the drawings, a schematically illustrated flight propulsion gas turbine engine 10 has a casing 12 defining a main rotor axis 14. The casing 12 has a compressor section 16 at the front of the engine, a turbine section 18 at the aft end of the engine, and a combustor section 20 in the middle. A gasifier or gas generator rotor 22 of the engine includes a multi-stage axial compressor 24 in the compressor section 16 and a high pressure turbine 26 in the turbine section 18 rigidly interconnected by a tubular gasifier shaft 28. An annular combustor 30 is disposed in the combustor section 20 between the compressor and the high pressure turbine. A free power turbine rotor 32 of the engine 10 includes a low pressure turbine 34 rigidly connected to an output shaft 36 disposed within the gasifier rotor shaft 28. The output shaft projects from the front of the engine for connection to driven machinery, not shown. The power turbine rotor is supported by bearings, not shown, on the casing 12 for rotation about the main axis 14.

Figure 2:
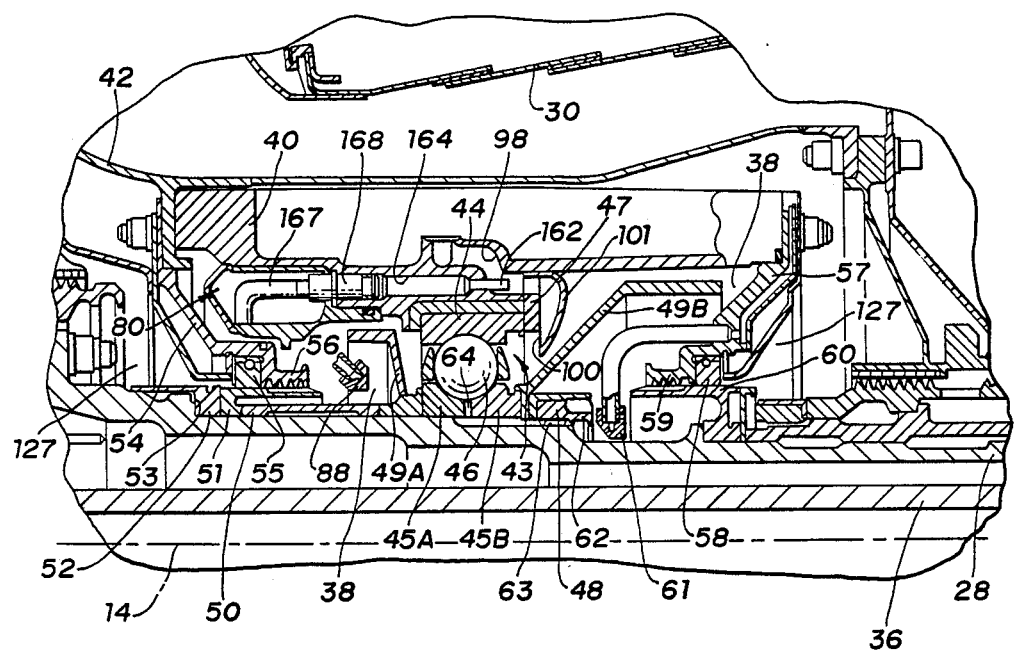
FIG. 2 is an enlarged, fragmentary sectional view of the center bearing sump of the engine depicted in FIG. 1.

As seen best in FIGS. 1 and 2, a center enclosure or sump 38 of the engine is located radially inboard of a generally annular center sump housing 40. The housing 40 is a rigid internal appendage of the casing 12 of the engine and may be attached to the latter through an internal annular web 42. A center bearing 43 is disposed between the housing 40 and the tubular gasifier rotor shaft 28. The bearing has an outer race 44 supported in the housing, a two piece inner race 45A-B on the rotor shaft 28, and a plurality of bearing balls 46 between the races. The outer race is retained on the housing by a retainer plate 47. The inner race is retained on the rotor shaft 28 by a nut 48 which captures the inner race 45A-B, a pair of oil scavenge impellers 49A-B, a spacer 50, a seal runner 51, and a heat shield 52 against a shoulder 53 of the shaft 28.

Toward the front of the engine, the sump 38 is closed by an annular partition 54 attached to the web 42. The partition 54 carries a carbon seal 55 and a wind back thread seal 56 each of which cooperates with the seal runner 51 in defining front seals for the center sump 38. Toward the aft end of the engine, the sump 38 is closed by an annular partition 57 attached to the sump housing 40. The partition 57 carries a carbon seal 58 and a wind back thread seal 59 each of which cooperates with a seal runner 60 on the rotor shaft 28 to define aft or rear seals for the center sump 38. During normal engine operation, the bearing 43 is continuously lubricated by a primary flow of oil from an orifice in a nozzle 61 of the primary oil system of the engine. The oil from the nozzle is directed under a captive lip 62 of the nut 48 and then through a groove 63 in the shaft 28 and into the bearing 43 through a clearance groove 64 between the inner bearing races 45A and 45B.

Figure 3:
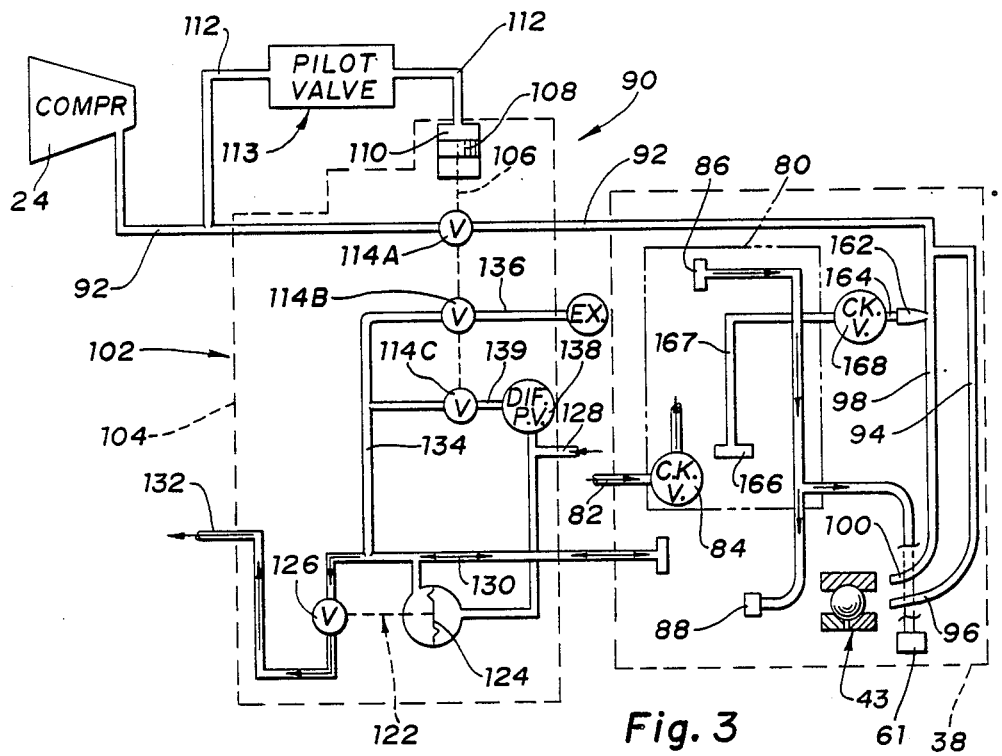
FIG. 3 is a schematic diagram of the secondary oil system according to this invention for the center sump depicted in FIG. 2.

Referring to FIGS. 2 and 3, a generally annular oil reservoir tank 80 is disposed in the sump 38 adjacent the bearing 43 and is rigidly attached to the sump housing 40. The reservoir tank is supplied with oil from the primary oil system of the engine through a duct 82 and a first check valve 84, FIG. 3. Normally, the pressure of the oil in duct 82 opens the check valve to fill the tank 80. After the tank is filled, the primary system pressure induces oil flow from the tank through a primary pickup 86 positioned at the top corner of the tank 80. The oil from the pick-up 86 issues from the aforesaid orifice in the nozzle 61 and from an additional orifice in that nozzle and from an orifice in a nozzle 88, FIGS. 2 and 3, whereby the bearing 43 and the seal runners 51 and 60 are lubricated and/or cooled. If primary oil flow stops, a secondary oil system 90 according to this invention maintains bearing lubrication and cooling for on the order of ten minutes.

Referring to FIGS. 2-4, the secondary oil system 90 includes an air circuit 92 from the compressor 24 of the engine to the center sump 38. Within the sump, the circuit 92 branches into a cooling circuit portion 94 terminating at a schematically represented cooling jet 96 and into a mist circuit portion 98 terminating at a mist jet 100 represented in FIG. 2 by the open portion of a deflector shield 101 on the retainer plate 47. Between the compressor 24 and the center sump 38, the air circuit 92 traverses a secondary oil system air valve 102 which normally blocks the circuit to prevent passage of compressed air to the sump.

The valve 102 has a schematically represented housing 104 in which a valve element 106 is slidably disposed. The valve element 106 has a piston 108 at one end in a pilot pressure chamber 110 of the housing 104. The pilot pressure chamber 110 is connected to the compressor 24 through a pilot pressure circuit 112 which branches from the air circuit 92. A pilot valve 113 is dispersed in the pilot pressure circuit 112. The valve element 106 controls a plurality of on/off valves 114A-C of the secondary oil system air valve. A spring, not shown, biases the valve element 106 to a retracted position corresponding to no pressure in pilot pressure chamber 110. Conversely, air at the pressure in air circuit 92, when delivered through the pilot valve 113, moves the valve element 106 to an extended position and initiates secondary oil system operation. The on/off valve 114A is in the air circuit 92. When the valve element 106 is in the retracted position, the valve 114A is closed and the circuit 92 is blocked. When the valve element 106 is in the extended position, the valve 114A is open and compressed air flows, respectively, to the cooling and mist circuit portions 94 and 98.

A deceleration valve 122 is provided to assure that the pressure in the sump 38 stays less than the pressure surrounding the sump during engine deceleration. The deceleration valve has a diaphragm portion 124 and a gate portion 126. One side of the diaphragm in diaphragm portion 124 is exposed to the pressure in a region 127, FIG. 2, surrounding the sump 38 through a duct 128. The other side of the diaphragm is exposed to sump pressure through a duct 130. The position of the diaphragm controls the opening of the gate portion 126 which is disposed in a branch 132 between the duct 130 and the interior of an accessory gearbox, not shown. As long as the pressure in zone 127 exceeds sump pressure by 25 psia, the gate portion 126 remains closed. If sump pressure rises to within 25 psia of the pressure in zone 127, the gate portion opens to permit air flow from sump 38 to the vented gearbox through the branch 132.

A second exhaust path between the center sump 38 and atmosphere is defined through a second branch 134 from the duct 130. The on/off valve 114B is disposed in the second branch 134 between the duct 130 and a duct 136 to the engine exhaust. The on/off valve 114B is closed when the valve element 106 is in the retracted position and open when the valve element 106 is in the extended position.

The durability of the carbon seals 55 and 58 is maximized by limiting the pressure difference between the sump 38 and the surrounding zone 127 of the engine to about 25 psia. To that end, a differential pressure valve 138 is disposed in a cross-over duct 139 between the duct 128 and the branch 134. In addition, the on/off valve 114C is also disposed in the cross-over duct 139. The on/off valve 114C is open in the retracted position of the valve element 106 and closed in the extended position of the valve element 106. When the on/off valve is closed, the cross-over duct is blocked and the effect of the differential valve is negated. When the on/off valve is open, the differential valve 138 senses pressure in sump 38 through the duct 130 and branch 134 and the pressure in zone 127 through duct 128. When the differential pressure is less than 25 psia, the differential valve is closed. When the differential pressure exceeds 25 psid, as for example when scavenge pump suction is high and leakage through the carbon seals is low, the differential pressure valve 138 opens and permits air to bleed into the sump from the duct 128 via the cross-over duct 139, the branch 134 and the duct 130.

Figure 4A:
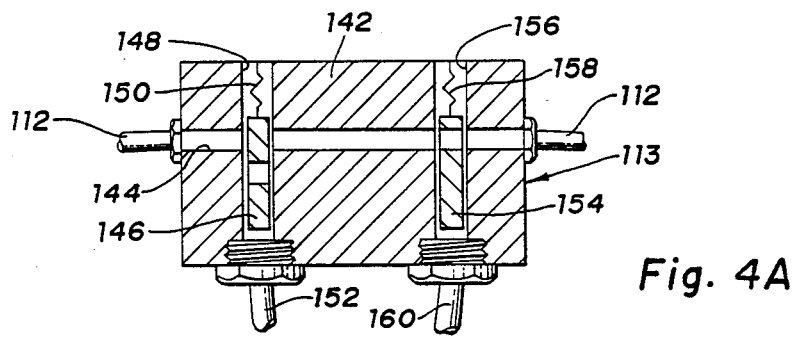
FIGS. 4A-4C are schematic representations of the pilot valve of the secondary oil system according to this invention depicting the condition of the pilot valve when the engine is off, when the engine is on, and when secondary lubrication is required.
Figures 4B, 4C:
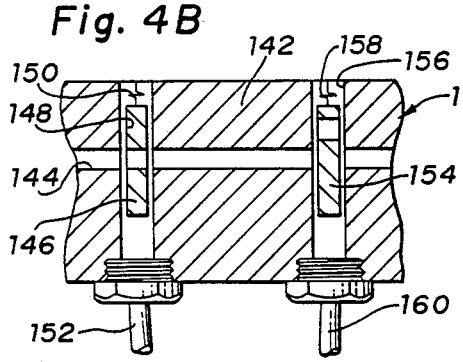

As seen best in FIGS. 1, 3 and 4, pilot valve 113 includes a schematically illustrated valve housing 142 having a main passage 144 therethrough in the pilot pressure circuit 112. A first valve element 146 of the pilot valve is disposed in a cross bore 148 in the housing and is biased by a spring 150 to a blocking position, FIG. 4A, blocking the main passage 144 and the pilot pressure circuit 112. One end of first valve element 146 is exposed to engine fuel pressure in the fuel system of the engine through a pipe 152. When fuel pressure exceeds a pressure corresponding about to engine idle, the first valve element 146 is moved to a non-blocking position, FIGS. 4B-C, wherein the valve element does not block or obstruct flow through the main passage 144 and the pilot pressure circuit.

A second valve element 154 of the pilot valve is disposed in a cross bore 156 in the housing and is biased by a spring 158 to a non-blocking position, FIGS. 4A and 4C, wherein the second valve element does not block or obstruct flow in main passage 144 or the pilot pressure circuit. One end of second valve element 154 is exposed to oil pressure in the primary oil system of the engine through a pipe 160. When primary oil pressure exceeds a pressure corresponding about to engine idle, the second valve element 154 is moved to a blocking position, FIG. 4B, wherein the valve element blocks or obstructs flow through the main passage 144 and the pilot pressure circuit.

As seen best in FIGS. 2 and 3, a mist nozzle 162 attached to the sump housing 40 at the end of a bore 164 in the housing has a tip projecting into the aforesaid mist circuit portion 98. A secondary oil pickup 166 located at the bottom aft corner of the reservoir tank 80 is connected to the bore 164 through a tube 167. A check valve 168 is disposed between the mist nozzle 162 and the tube 167. A spring, not shown, biases the check valve open. Primary oil pressure in the tank 80 normally holds the check valve 168 closed to prevent oil flow to the mist nozzle 162 except in the absence of primary oil pressure.

The secondary oil system 90 operates as follows. When the engine is off, the valve elements 146 and 154 in the pilot valve 113 assume the positions depicted in FIG. 4A blocking the pilot pressure circuit 112. Valve element 106 in the air valve 102 is in the retracted position so that on/off valve 114A is closed and air circuit 92 is blocked. On/off valve 114C is open and on/off valve 114B is closed.

When the engine is started, oil from the primary oil system of the engine unseats the check valve 84, fills the reservoir tank 80 and forces oil from the tank through the primary pickup 86 and then onto the center bearing 43 and under the seal runners 51 and 60 through the schematically illustrated nozzles 61 and 88. Primary oil pressure in reservoir tank 80 closes the check valve 168 to prevent escape of oil through mist nozzle 162.

In the pilot valve 113, the first valve element 146 responsive to fuel pressure assumes the non-blocking position, FIG. 4B, as fuel pressure quickly achieves a magnitude corresponding to about engine idle. The second valve element 154 responsive to primary oil pressure assumes the blocking position as primary oil pressure likewise quickly achieves a magnitude corresponding to about engine idle so that pilot pressure circuit 112 is blocked. The valve element 106 in the air valve 102 remains in the retracted position wherein on/off valve 114A blocks air flow in the air circuit 92. On/off valve 114C remains open and on/off valve 114B remains closed.

If pressure in the primary oil system becomes abnormally low while the engine is otherwise operating normally, the second valve element 154 in the pilot valve 113 is shifted by spring 158 from the blocking to the non-blocking position, FIG. 4C, so that pilot pressure circuit 112 is unblocked. Compressed air flows to the pilot pressure chamber 110 and shifts the valve element 106 in the air valve 102 to the extended position opening on/off valves 114A and 114B and closing on/off valve 114C.

Compressed air flows through the air circuit 92 to the cooling circuit portion 94 and to the mist circuit portion 98. The airflow through the mist circuit portion 98 passes over the tip of the mist nozzle 162 and creates a low pressure zone which induces oil flow from the reservoir tank 80 to the nozzle 162. Oil issuing from the nozzle 162 is entrained as a mist in the air flow in the mist circuit portion. The air/oil mist is directed by the deflection shield 101 at the bearing 43 for secondary lubrication. To avoid over pressurizing the center sump, the open on/off valve 114B conducts air from the sump via duct 130 and branch 134 to ambient exhaust through duct 136. The closed on/off valve 114C prevents differential pressure valve 138 from interfering with venting of the sump 38. During secondary oil system operation, oil is prevented from back flowing out of the reservoir tank through oil supply duct 82, should that duct be ruptured, by the check valve 84.

The embodiments of the invention in which an exclusive property or privilege is claimed are defined as follows:

1. In a gas turbine engine having a source of compressed air, a rotor bearing in a bearing sump of said engine, a primary oil system for lubricating said bearing including an oil reservoir tank in said sump filled by said primary oil system during normal engine operation, and a source of fuel under pressure
   a secondary oil system comprising:
   a secondary oil system air circuit between said compressed air source and said bearing sump including a mist circuit portion,
   a mist nozzle having a tip exposed to airflow in said mist circuit portion whereby a low pressure zone is defined at said tip during airflow through said mist circuit portion,
   a secondary oil pickup between said reservoir tank and said mist nozzle for conducting oil from said reservoir tank to said low pressure zone at said mist nozzle tip,
   a secondary oil system air valve in said secondary oil system air circuit having a valve element normally disposed in a retracted position blocking said secondary oil system air circuit and movable by air pressure in a pilot pressure chamber of said secondary oil system air valve from said retracted position to an extended position unblocking said secondary oil system air circuit,
   a pilot pressure circuit between said compressed air source and said pilot pressure chamber, and
   a pilot valve disposed in said pilot pressure circuit having a first element responsive to fuel pressure in said fuel system blocking said pilot pressure circuit only when fuel pressure is below a magnitude corresponding to engine idle conditions and a second element responsive to primary oil pressure blocking said pilot pressure circuit only when primary oil pressure is above a magnitude corresponding to engine idle conditions whereby said pilot pressure circuit is unblocked only when fuel pressure is above said engine idle magnitude and primary oil pressure is below said engine idle magnitude.

2. The secondary oil system recited in claim 1 and further including,
   means defining a cooling circuit portion of said secondary oil system air circuit extending from said secondary oil system air circuit to said bearing sump.

3. In a gas turbine engine having a source of compressed air, a rotor bearing in a pressurized bearing sump of said engine, a primary oil system defining a source of oil under pressure and including a reservoir tank in said sump supplied with oil under pressure by said primary oil system during normal engine operation, and a source of fuel under pressure,
   a secondary oil system comprising:
   a first check valve between said primary oil system and said reservoir tank permitting oil flow into said reservoir tank and preventing backflow of oil into said primary oil system when the pressure in said reservoir tank exceeds the pressure in said primary oil system,
   primary oil distribution means between said reservoir tank and said bearing sump for conducting a primary oil flow to said bearing when the pressure in said reservoir tank exceeds the pressure in said bearing sump,
   a secondary oil system air circuit between said compressed air source and said bearing sump including a mist circuit portion,
   a mist nozzle having a tip exposed to airflow in said mist circuit portion whereby a low pressure zone is defined at said tip during airflow through said mist circuit portion,
   a secondary oil pickup between said reservoir tank and said mist nozzle for conducting oil from said reservoir tank to said low pressure zone at said mist nozzle tip,
   a second check valve between said secondary oil pickup and said mist nozzle tip biased to an open position permitting oil flow from said reservoir tank to said low pressure zone at said mist nozzle tip and actuated to a closed position preventing oil flow to said low pressure zone by primary oil pressure in said reservoir tank, means defining an atmospheric vent circuit between said bearing sump and the atmosphere surrounding said engine, a secondary oil system air valve having a first on/off valve in said secondary oil system air circuit and a second on/off valve in said atmospheric vent circuit and a common valve element controlling each of said first and said second on/off valves normally disposed in a retracted position wherein said first on/off valve blocks said secondary oil system air circuit and said second on/off valve blocks said atmospheric vent circuit, said valve element being movable by air pressure in a pilot pressure chamber of said secondary oil system air valve from said retracted position to an extended position wherein said first on/off valve unblocks said secondary oil system air circuit and said second on/off valve unblocks said atmospheric vent circuit, a pilot pressure circuit between said compressed air source and said pilot pressure chamber, and a pilot valve disposed in said pilot pressure circuit having a first element responsive to fuel pressure in said fuel system blocking said pilot pressure circuit only when fuel pressure is below a magnitude corresponding to engine idle conditions and a second element responsive to primary oil pressure blocking said pilot pressure circuit only when primary oil pressure is above a magnitude corresponding to engine idle conditions whereby said pilot pressure circuit is unblocked only when fuel pressure is above said engine idle magnitude and primary oil pressure is below said engine idle magnitude.

4. The secondary oil system recited in claim 3 and further including, means defining a cooling circuit portion of said secondary oil system air circuit extending from said secondary oil system air circuit to said bearing sump.

* * * * *